United States Patent
Cohen

(10) Patent No.: US 10,971,294 B2
(45) Date of Patent: *Apr. 6, 2021

(54) FRACTAL SWITCHING SYSTEMS AND RELATED ELECTROMECHANICAL DEVICES

(71) Applicant: Fractal Antenna Systems, Inc., Bedford, MA (US)

(72) Inventor: Nathan Cohen, Belmont, MA (US)

(73) Assignee: Fractal Antenna Systems, Inc., Bedford, MA (US)

( * ) Notice: Subject to any disclaimer, the term of this patent is extended or adjusted under 35 U.S.C. 154(b) by 43 days.

This patent is subject to a terminal disclaimer.

(21) Appl. No.: 16/411,654

(22) Filed: May 14, 2019

(65) Prior Publication Data
US 2019/0267176 A1    Aug. 29, 2019

Related U.S. Application Data

(63) Continuation of application No. 16/011,423, filed on Jun. 18, 2018, now Pat. No. 10,290,413.

(60) Provisional application No. 62/520,821, filed on Jun. 16, 2017.

(51) Int. Cl.
| | |
|---|---|
| *H01F 3/00* | (2006.01) |
| *H01F 27/10* | (2006.01) |
| *H01F 3/10* | (2006.01) |
| *H01F 7/06* | (2006.01) |
| *H01F 7/20* | (2006.01) |
| *H01F 41/071* | (2016.01) |
| *H02K 3/04* | (2006.01) |

(52) U.S. Cl.
CPC ............. *H01F 27/105* (2013.01); *H01F 3/00* (2013.01); *H01F 3/10* (2013.01); *H01F 7/06* (2013.01); *H01F 7/20* (2013.01); *H01F 7/202* (2013.01); *H01F 41/071* (2016.01); *H02K 3/04* (2013.01)

(58) Field of Classification Search
CPC ..................................... H01F 3/00; H01F 3/10
See application file for complete search history.

(56) References Cited

U.S. PATENT DOCUMENTS

| | | |
|---|---|---|
| 7,999,754 B2 | 8/2011 | Cohen |
| 9,647,271 B2 | 5/2017 | Cohen |
| 9,847,583 B1 | 12/2017 | Cohen |
| 9,965,663 B2 | 5/2018 | Cohen |
| 2012/0092105 A1 | 4/2012 | Weinberg |
| 2014/0002223 A1 | 1/2014 | Sainz |

*Primary Examiner* — Ramon M Barrera
(74) *Attorney, Agent, or Firm* — Cesari and McKenna, LLP

(57) ABSTRACT

This invention entails the use of fractal shapes as cores for electromagnets, and a concurrent shape of a fractal for the windings which surround it. The novelty of this invention lies not only with the shaping, but the advantage of such shaping, which includes producing a smaller form factor electromagnet for the same desired magnetic field strength, when compared to a conventional electromagnet. It will be appreciated that a range of devices including electromagnets, based on such fractal shaping, are additionally novel and include but are not limited to solenoid switches, relays, and other devices in which the fractal electromagnets are used to make a change in state of some device.

10 Claims, 5 Drawing Sheets

FRACTAL SWITCHING SYSTEMS AND RELATED ELECTROMECHANICAL DEVICES

CROSS-REFERENCE TO RELATED APPLICATION

This application is a continuation of U.S. patent application Ser. No. 16/011,423 entitled "Fractal Switching Systems And Related Electromechanical Devices" filed Jun. 18, 2018 which is based upon and claims priority to U.S. provisional patent application No. 62/520,821, entitled "Fractal Switching Systems and related Electromechanical Devices," filed Jun. 16, 2017; the entire contents of both of which are incorporated herein by reference.

BACKGROUND

Electromagnets are a long-established and useful tool for performing a number of actions where magnetic attraction is invoked. The magnetic properties are defined by the structure of the electromagnet, which in its simplest form comprises an iron (or other metal)-based core surrounded by insulated conductive wire, windings of a coil, and then attachment to a power source. The power source, when driven through the windings, produces a compact magnetic field which then turns the core into a magnet as long as the current flows.

FIG. 1 is a diagram of a conventional circular winding 100 for use in a conventional electromagnet.

FIG. 2 depicts a conventional cylindrical magnet 200 for use with a conventional electromagnet, e.g., as shown in FIG. 1.

The emphasis on electromagnets in the prior art has been predominately on materials that make up the core, as opposed to the shape of the core and the wire windings which surround it. This is been predicated on the assumption that the best way to do a core is in the form of a circular cylinder. However there is no reason based on physics why other shapes cannot and should not be used to make electromagnets.

SUMMARY

As aspect of the present disclosure provides or entails the use of fractal shapes as cores for electromagnets. A further aspect of the present disclosure provides or entails the use of fractal shape(s) for the windings which surround a core. In exemplary embodiments, one or more fractal windings may be used concurrently with one or more cores having fractal shapes. Advantages of such fractal structures and/or "shapings" can include electromagnetic devices and structures producing or having a smaller form factor for the same desired magnetic field strength, when compared to conventional electromagnet structures and devices.

It will be appreciated that, based on such fractal shaping, a range of novel fractallized switching devices (including electromagnet structures) are realizable in accordance with the present disclosure; such devices and/or structures can include, but are not limited to, solenoid switches, relays, and other devices in which the fractal electromagnets are used to make a change in state of or produced by a given device.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Figure 1:
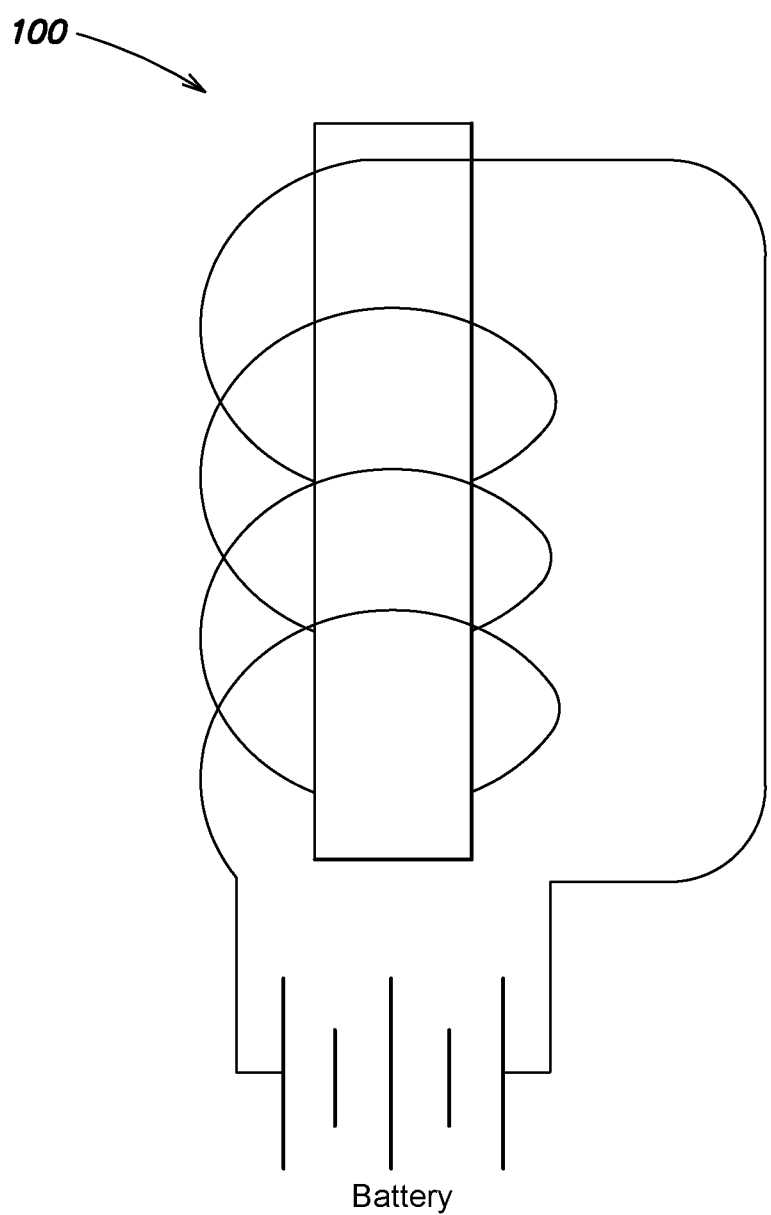
FIG. 1 is a diagram of a conventional circular electromagnet.

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

As referenced above, as aspect of the present disclosure provides or entails the use of fractal shapes as cores for electromagnets. A further aspect of the present disclosure provides or entails the use of fractal shape(s) for the windings which surround a core. In exemplary embodiments, one or more fractal windings may be used concurrently with one or more cores having fractal shapes. Advantages of such fractal structures and/or "shapings" can include electromagnetic devices and structures producing or having a smaller form factor for the same desired magnetic field strength, when compared to conventional electromagnet structures and devices. According to further aspects of the present disclosure, based on such fractal shaping, a range of novel fractallized switching devices (including electromagnet structures) are realizable in accordance with the present disclosure; such devices and/or structures can include, but are not limited to, solenoid switches, relays, and other devices in which the fractal electromagnets are used to make a change in state of or produced by a given device.

A fractal shape is one in which a complex shape is made by building up several scales of a simpler shape. Such fractal shapes are often described as self similar, and a new scaling may be referred to as an "iteration." It will be noted that the definition of fractal in a practical sense, such as used herein, incorporates two or more iterations of a simple shape to make the complex fractal shape, and does not invoke an infinite number iterations to do so. It will further be noted from review of the inventor's prior patents on fractal related inventions—such as U.S. Pat. Nos. 9,965,663, 9,935,503, 9,847,583, 9,647,271, and 7,999,754—that this working definition of "fractal," e.g., having fewer or a set number or range in number of iterations, has become an accepted and well-known. It will be appreciated that all uses of the term "fractal" in the context of the present disclosure can refer to at least portions of, e.g., a trace or winding or contour of a magnet or shape or structure, where there is a fractal iteration on two or more size scales. All of the above-referenced patents are incorporated herein by reference in their entireties.

As previously mentioned, an aspect of the present disclosure provides an electromagnet having a core, or magnet, that is fractal shaped. Such cores or magnets can present a perimeter that is substantially greater than a circular cylinder of the same outer dimensions, e.g., width and/or height. As windings can be expressed and placed on the perimeter of such a fractal cylinder, when acting as a core of an electromagnet, the length of the windings—themselves fractal in shape—will be substantially greater than would otherwise be achieved with a circular cylinder used for the core. Because the magnetic field relates directly to the actual length of wire and its placement of windings, it will be appreciated that the magnetic field will by definition be stronger with such a fractal shape. The fractal core preferably is composed of one or more magnetic materials, e.g., iron or cobalt or the like, that allow the magnetic field to be concentrated and thus have the core act as a magnet as long as the windings are powered by an outside power source. A fractal electromagnet or related structure (e.g., core) according to the present disclosure can thus work as a more compact device, e.g., which has the pleasing feature of having the same magnetic field attraction of a much larger conventional electromagnet.

Figure 2:
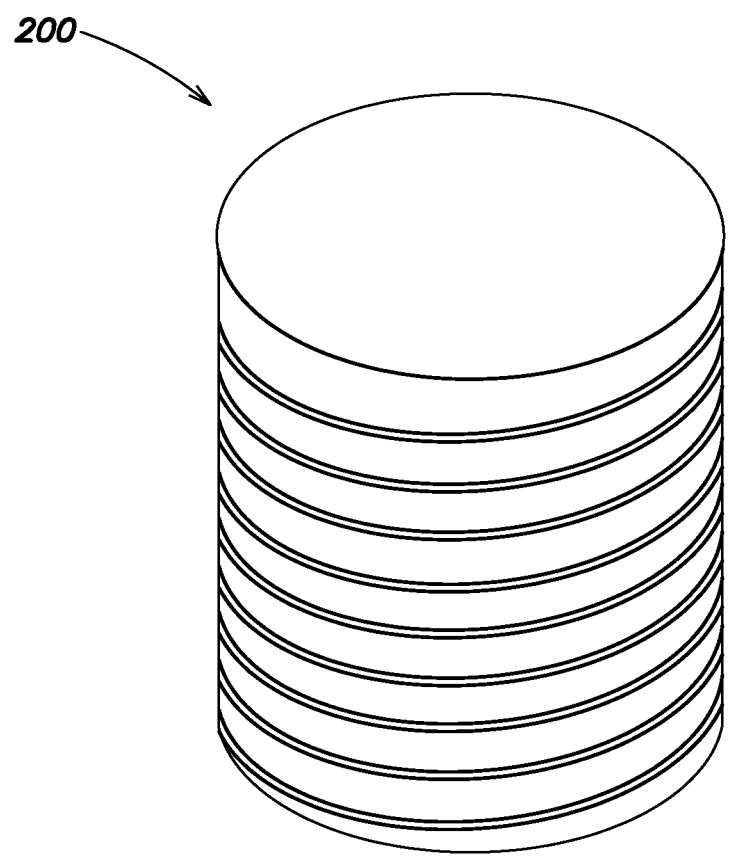
FIG. 2 depicts a conventional cylindrical magnet and coils for use as a conventional electromagnet.

For example, in a fractal electromagnet according to the present disclosure, coils of wire are formed as contiguous and attached turns with fractal shapes, such as (but not limited to) a Koch island, Minkowski Island, or Koch Snowflake or other suitable fractal or fractal-like shapes. While prior art electromagnets rely on non-fractal shapes (see the circular turn and core of FIGS. 1 and 2, respectively), fractal electromagnets according to the present disclosure rely on fractal turn and/or fractal shaped cores (see a rough depiction of fractal coils in FIGS. 3-4 and fractal core with fractal turns in FIG. 5, respectively). In addition, the electromagnet core (which in prior art devices would otherwise be a circular rod) can be replaced by a rod with a fractal shape that translates (extends) down the rod length. For example, an electromagnetic core can have a circumference that includes or is defined by (over the whole extent or part of its extent) a fractal curve (of at least two or more iterations). The fractal circumference can extend along at least part of the extent of the longitudinal axis of the core (the long axis), such that part, or the entire surface, forms a fractal-shaped cylinder (in the strict definition of a cylinder, i.e., not the more common usage equating to a circular cylinder). This thus places the rod in near proximity to the shape of the fractal turns (bends). Apparatus and methods of/for construction of such devices, e.g., such as use of a jig and/or molding process, are also claimed as novel and considered to be part of the invention.

Exemplary embodiments of the present disclosure can utilize a fractal electromagnet in a switching system. In this case the electromagnet can be operated in an on and off fashion to attract a lever or some other device thereby turning a switch on and off.

In exemplary embodiments, a fractal switch can be purely capacitive, where a capacitance change—due to a change is proximity of, say a finger or other device or structure—activates the switch. In this case the fractal acts as a capacitor rather than a magnet. Such a fractal capacitor-activated switch which may this also be used as a not merely a switch but an indicator of change, thus rendering the fractal "switch" into a fractal "sensor."

A further embodiment entails fractal electromagnets as components of dynamos, motors, solenoids, generators and/or electromagnetic actuators. It will be appreciated that the changing magnetic field afforded by in this case fractal electromagnets allows for more compact and/or smaller motors, dynamos, solenoids, actuators, and so on. Alternatively, for the same given form factor, improved performance can be achieved with such fractal electromagnets.

A further embodiment of the invention includes a cooling system for the fractal electromagnet. It will be appreciated that such a fractal shape, for example comprising a fractal electromagnet in a cylindrical height, can then be surrounded by an outer sheath or housing (e.g., a cylindrical or rectangular housing) and a fluid, such as air, water, or other, may be forced to flow through the cylinder or housing (e.g., by a pump or fan), thereby cooling the coil windings and fractal shaped core. The fluid can be part of a fluidic circuit operative to cool the coils or windings of the electromagnet (and the electromagnet itself including the core, which can absorb heat). The fluidic circuit can include a heat sink such as a radiator or other heat transfer device, e.g., an air-to-air intercooler, a liquid (e.g. water)-to-air water cooler, and the like. Thus in a fractal electromagnet the opportunity for cooling is additionally shrunken in size with that added benefit.

It will be appreciated that not all electromagnet cores are necessarily cylinders (typically thought of as circular cylinders). The example is given for easiest illustration of the invention, but will be appreciated that any fractal-like core shape with its concurrent coil windings being also fractal shapes, affords the advantages so named.

Figure 3:
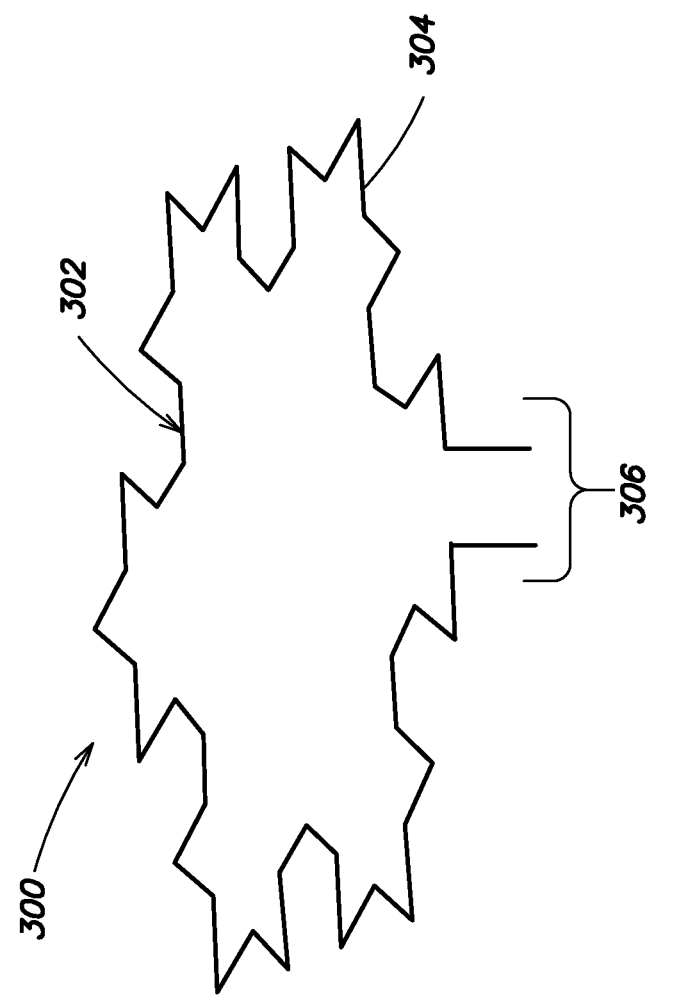
FIG. 3 depicts a fractal winding, in accordance with an exemplary embodiment of the present disclosure.

FIG. 3 depicts a fractal winding 300, in accordance with an exemplary embodiment of the present disclosure. As shown, winding (or, turn) 300 has a fractal or fractallized path 302 having multiple generator motifs 304. Circuit connections 306 are shown, e.g., for connection to a current or power source. Winding 300 can be made of or include any suitable conductive material, including but not limited to copper, silver, conductive ink, conductive plastic, and/or the like.

Figure 4:
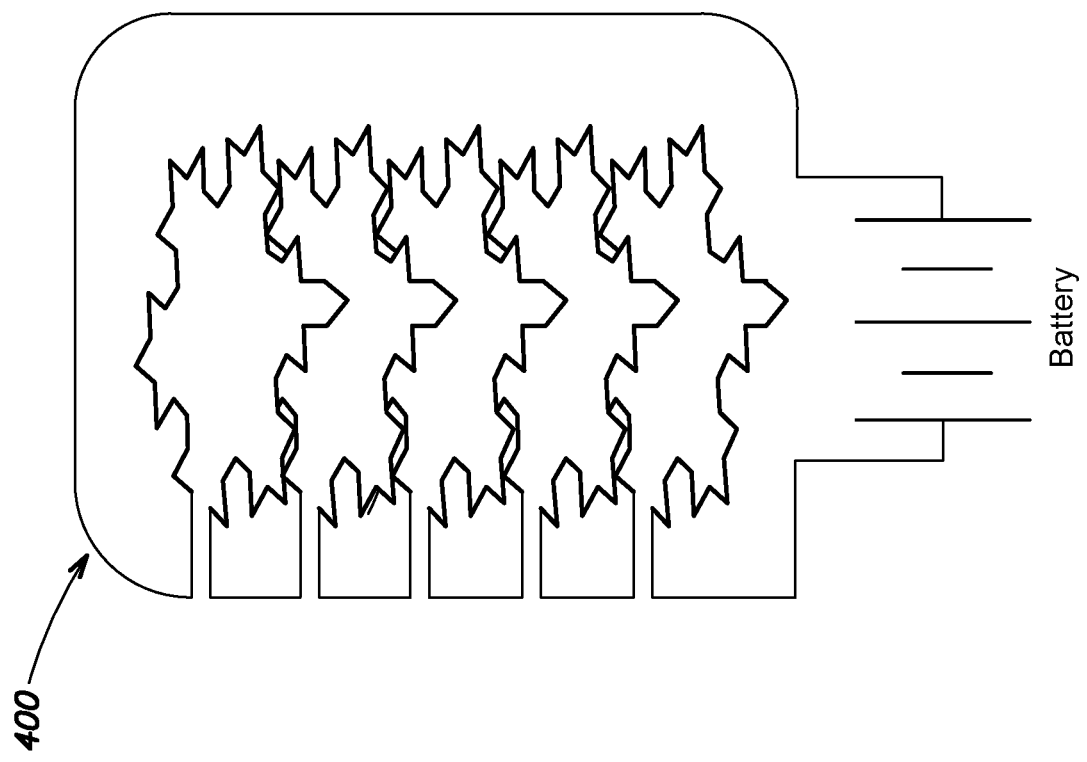
FIG. 4 depicts multiple stacked fractal windings, in accordance with an exemplary embodiment of the present disclosure.

FIG. 4 depicts a set or stacking 400 of multiple fractal windings similar to the one of FIG. 3, in accordance with an exemplary embodiment of the present disclosure. Such a stacking 400 can be used with a core for, e.g., an electromagnet or electromagnetic actuator. Preferable the coils are wrapped in or coated with an insulating material such that that when adjacent to one another current cannot travel directly between physically adjacent coils; rather the current travels along the (shaped) longitudinal axis of the coil or winding. Any suitable insulating material can be used.

Figure 5:
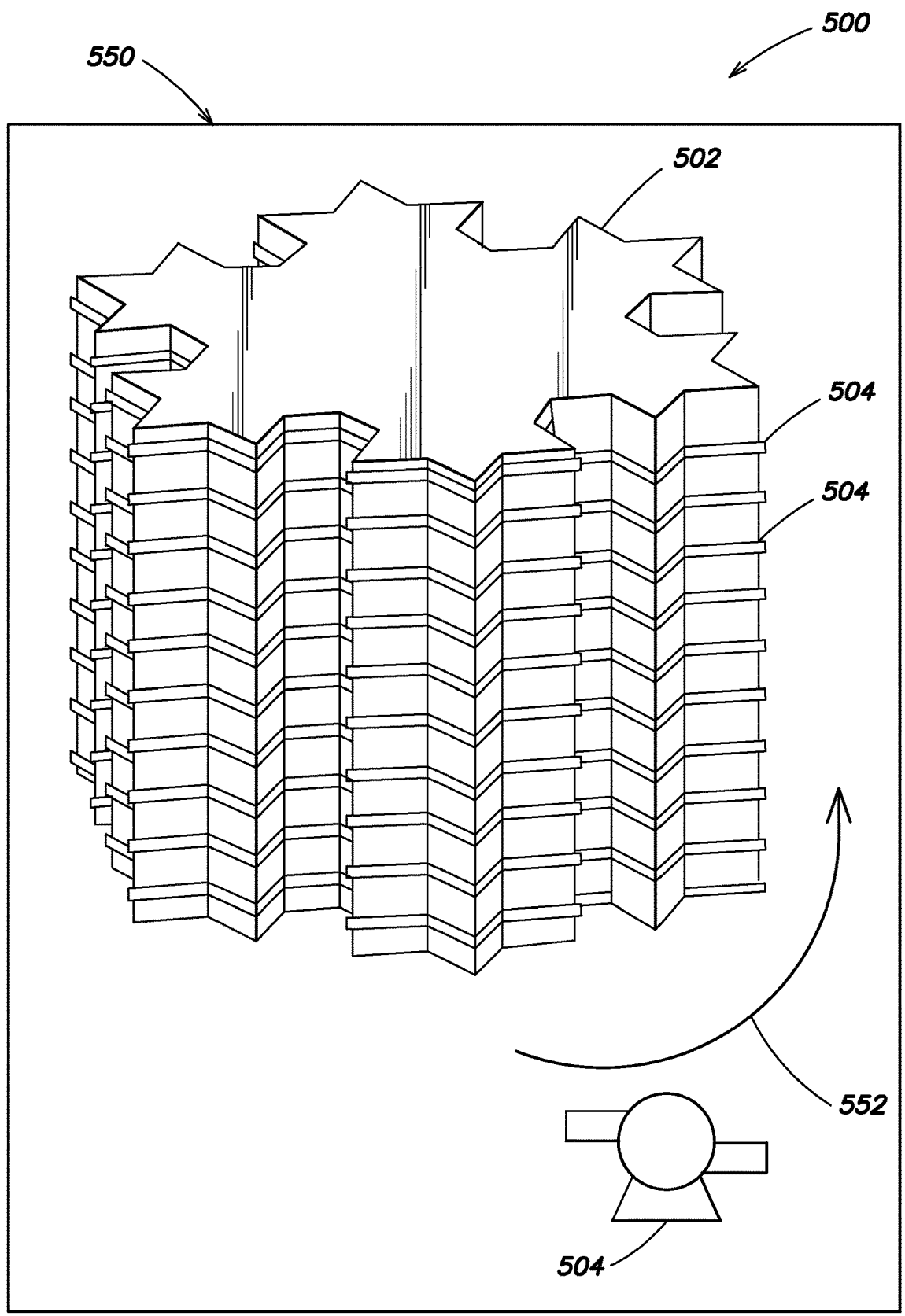
FIG. 5 depicts a fractal magnet for use with a fractal electromagnet according to exemplary embodiments of the present disclosure.

FIG. 5 depicts a fractal magnet with windings configured as a fractal electromagnet 500 according to exemplary embodiments of the present disclosure. As shown, electromagnet 500 includes a core 502 having a cross-section in the shape of a Koch star. A number of coils or windings 504 are wrapped or configured around the circumferential face (relative to a longitudinal axis) of the core 502. When current from a power supply is sent through the coils, the electromagnet 500 will become active.

Figure 6:
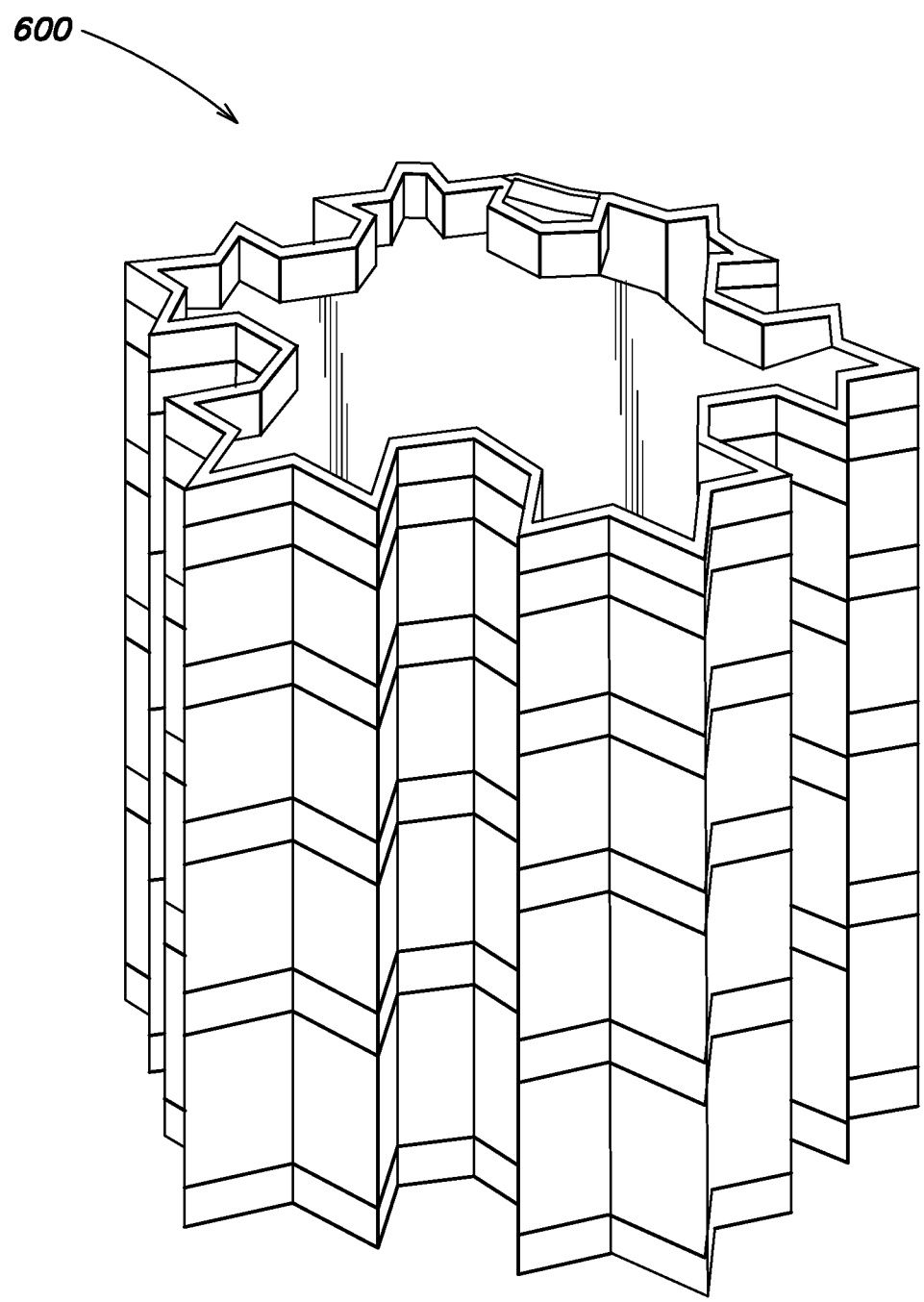
FIG. 6 is a photograph of an exemplary embodiment of a fractal magnet in accordance with an exemplary embodiment of the present disclosure.

FIG. 6 is a photograph of an exemplary implemented 600 embodiment of a fractal magnet with core and windings, similar to that of FIG. 5, in accordance with an exemplary embodiment of the present disclosure.

Further exemplary embodiments are directed to a fractal solenoid or solenoid system, which can operate as a switch or actuator activated by an electromagnet. Such a fractal solenoid employs or relies on a fractal core that is moveable with respect to the related windings. Other fractal electromagnet-controlled and or activated switches are also within the scope of the present disclosure.

If desired, a fractal switch can be purely capacitive, where the capacitance change by proximity of, say a finger (finger-like or branched structure) or other device or structure. In this case the fractal acts as a capacitor rather than a magnet. Such a fractal capacitor-activated switch which may this also be used as not merely as which but an indicator of change (e.g., a certain amount of charge, etc.) thus rendering the fractal 'switch' into a fractal 'sensor'. Like the fractal electromagnet, the fractal coil turns may replace conventional 'windings' of dynamos, transformers, and motors and this novelty is so claimed.

EXEMPLARY EMBODIMENTS

1. A fractal electromagnetic switching system comprising: a core including a fractal surface; and a plurality of windings disposed around the core and configured to receive and conduct an electric current.

2. The system of embodiment 1, wherein at least one winding of the plurality of windings has a fractal shape.

3. The system of embodiment 2, wherein the fractal shape comprises a Koch star.

4. The system of embodiment 1, wherein the core comprises a ferrous material.

5. The system of embodiment 1, wherein the core comprises cobalt.

6. The system of embodiment 1 further comprising a cooling system operative to remove heat from the windings.

7. The system of embodiment 6, wherein the cooling system comprises: a housing surrounding the plurality of windings; and a fluid held by the housing and in contact with the windings.

8. The system of embodiment 7, further comprising a pump operative to force the fluid from the windings to a heat sink.

9. The system of embodiment 7, wherein the fluid comprises water.

10. The system of embodiment 7, wherein the fluid comprises air.

11. A fractal electromagnetic actuator or solenoid comprising: a core including a fractal surface; and a plurality of windings disposed around the core and configured to receive and conduct an electric current; wherein the core is moveable with respect to the windings and in response to a current passing through the windings; an actuating rod, arm, or other linkage can be connected to the core, e.g., for moving or actuating a switch or flow valve, or the like, etc.

12. The system of embodiment 11, wherein at least one winding of the plurality of windings has a fractal shape.

13. The system of embodiment 12, wherein the fractal shape comprises a Koch star.

14. The system of embodiment 11, wherein the core comprises a ferrous material.

15. The system of embodiment 11, wherein the core comprises cobalt.

16. A fractal electromagnet system comprising: a core including a fractal surface; and a plurality of windings disposed around the core and configured to receive and conduct an electric current.

17. The system of embodiment 16, wherein at least one winding of the plurality of windings has a fractal shape.

18. The system of embodiment 17, wherein the fractal shape comprises a Koch star.

19. The system of embodiment 16, wherein the core comprises a ferrous material.

20. The system of embodiment 16, wherein the core comprises cobalt.

21. The system of embodiment 17 further comprising a cooling system operative to remove heat from the windings.

22. The system of embodiment 21, wherein the cooling system comprises: a housing surrounding the plurality of windings; and a fluid held by the housing and in contact with the windings.

23. The system of embodiment 22, further comprising a pump operative to force the fluid from the windings to a heat sink.

24. The system of embodiment 22, wherein the fluid comprises water.

25. The system of embodiment 22, wherein the fluid comprises air.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

What is claimed is:

1. A method of actuation using a fractal actuator, the method comprising:
   providing a core including a fractal surface, wherein the core has a longitudinal axis and the fractal surface has a fractal perimeter in a radial direction relative to the longitudinal axis; and
   disposing a plurality of windings around the core, wherein the plurality of windings is configured to receive and conduct an electric current;
   wherein the core is movable with respect to the plurality of windings and in response to a current passing through the windings;
   applying an electric current to the plurality of windings and thereby effecting movement of the core with respect to the plurality of windings.

2. The method of claim 1, wherein at least one winding of the plurality of windings has a fractal shape.

3. The method of claim 2, wherein the fractal shape comprises a Koch star.

4. The method of claim 1, wherein the core comprises a ferrous material.

5. The method of claim 1, wherein the core comprises cobalt.

6. The method of claim 1 further comprising cooling the actuator using a cooling system operative to remove heat from the plurality of windings.

7. The method of claim 6, wherein the cooling system comprises:
   a housing surrounding the plurality of windings; and
   a fluid held by the housing and in contact with the windings.

8. The method of claim 6, further comprising using a pump to move fluid from the plurality of windings to a heat sink.

9. The method of claim 6, wherein the fluid comprises water.

10. The method of claim 6, wherein the fluid comprises air.

* * * * *